United States Patent [19]

Levine

[11] 4,356,962

[45] Nov. 2, 1982

[54] THERMOSTAT WITH ADAPTIVE OPERATING CYCLE

[76] Inventor: Michael R. Levine, 2900 Heatherway, Ann Arbor, Mich. 48104

[21] Appl. No.: 206,761

[22] Filed: Nov. 14, 1980

[51] Int. Cl.³ .............................................. F23N 5/00
[52] U.S. Cl. ...................................... 236/11; 165/12; 236/46 F
[58] Field of Search ................ 165/26, 12; 236/78 R, 236/78 D, 1 R, 46 F, 11; 307/117; 364/557, 505, 500

[56] References Cited

U.S. PATENT DOCUMENTS

| | | | |
|---|---|---|---|
| 3,050,257 | 8/1962 | Sweger et al. | 236/74 |
| 3,183,705 | 5/1965 | Welkowitz | 73/1 |
| 3,220,648 | 11/1965 | Partsch | 236/9 |
| 3,324,725 | 6/1967 | Yerman | 73/362 |
| 3,443,121 | 5/1969 | Weisbrod | 236/46 F |
| 3,702,076 | 11/1972 | Georgi | 73/362 |
| 3,817,105 | 6/1974 | Luhowy | 73/362 |
| 3,877,307 | 4/1975 | Georgi | 73/362 |
| 3,912,913 | 10/1975 | Bunting | 235/150 |
| 3,922,535 | 11/1975 | Randolph | 235/151.1 |
| 3,939,459 | 2/1976 | Hoopes | 340/347 |
| 3,942,718 | 3/1976 | Palmieri | 236/78 |
| 3,964,676 | 6/1976 | Rooks et al. | 236/46 |
| 3,964,677 | 6/1976 | Schalow et al. | 236/46 |
| 3,972,237 | 8/1976 | Turner | 73/362 |
| 3,978,471 | 8/1976 | Kelly | 340/347 |
| 3,979,059 | 9/1976 | Davis et al. | 236/46 |
| 3,988,577 | 10/1976 | Leitner et al. | 235/151.1 |
| 3,996,451 | 12/1976 | Harrington et al. | 235/92 |
| 4,001,557 | 1/1977 | Stephenson | 235/151.1 |
| 4,071,745 | 1/1978 | Hall | 364/104 |
| 4,079,366 | 3/1978 | Wong | 340/309.4 |
| 4,172,555 | 10/1979 | Levine | 236/46 |
| 4,177,923 | 12/1979 | Krump | 236/46 |
| 4,196,356 | 4/1980 | Kabat | 236/46 F |
| 4,206,872 | 6/1980 | Levine | 236/46 |
| 4,215,815 | 8/1980 | Krump | 236/46 |
| 4,257,318 | 3/1981 | Johannsen | 236/78 D |
| 4,270,693 | 6/1981 | Hayes | 236/1 R |

OTHER PUBLICATIONS

"Enertrol Multiplex Energy Controller", American Stabilis, Sales Literature.
"ITT General Controls T199", Lee, E. K., Master Plumber and Heating Contractor, May 1969.
Jensen, NASA Tech. Briefs, Spring 1980, p. 33, A Thermostat Programable to Allow Temperature to Rise Gradually by Activation of a Heat Pump Prior to Later Activation of Resistance Heating System.

Primary Examiner—William E. Wayner
Attorney, Agent, or Firm—Krass, Young & Schivley

[57] ABSTRACT

An electronic thermostat operative to be connected to a furnace or other temperature modifying apparatus, to control its state of operation, includes means for generating a desired temperature set point signal and means for measuring ambient temperature on the thermostat. When the ambient temperature falls below the set point the furnace is energized for a predetermined period of time. The time of energization is increased or decreased by a small increment after each heating cycle depending upon magnitude of the temperature increase which occurred at the thermostat as a result of the heating cycle in order to adaptively achieve a predetermined temperature increase during the heating cycle and the thermal overshoot period which occurs following de-energization of the furnace.

In alternative embodiments of the invention the period of time in which the furnace is de-energized between heating cycles is controlled by a timer and adaptively modified in a similar manner, and the time delay between furnace energization and initiation of the blower at the beginning of a heating cycle and de-energization of the blower after the end of the heating cycle are similarly adaptively modified.

12 Claims, 3 Drawing Figures

THERMOSTAT WITH ADAPTIVE OPERATING CYCLE

DESCRIPTION

1. Technical Field

This invention relates to an electronic thermostat for measuring the temperature within a structure and controlling energization of the temperature modifying apparatus for the structure such as a furnace or air conditioning system, and more particularly to such a thermostat which adaptively modifies the time period of operation of the temperature modifying apparatus during each cycle in order to attain predetermined criteria.

2. Background Art

Thermostats for heating furnaces and/or air cooling systems (hereinafter collectively referred to as "furnaces") of the type employed in residences and many commercial and industrial buildings generally include storage means for a desired temperature set-point, means for measuring the actual temperature within the building, and means for switching the furnace on or off as a function of differences between the set-point temperature and the actual temperature.

To prevent the furnace from being rapidly turned on and then off as it hunts about the set-point temperature, these thermostats have a built-in dead zone; i.e., the temperature at which the thermostat contacts are closed to energize the furnace is slightly below the temperature at which they open after the furnace has warmed the room containing the thermostat. For example, when the set-point of the thermostat is adjusted to 70° F., the furnace burner may be energized when the temperature drops to 69° and de-energized when the room is heated to 71°. The temperature differential of the dead zone is determined on the basis of several considerations: if the dead zone is made very small the furnace will turn on and off relatively rapidly when the room temperature is close to the set-point, causing increased wear on the valves and the like, a decreased thermal efficiency because of the energy required to repeatedly heat the furnace and cooling ducts, and an annoying noise level produced by the rapid changes in air movement. A larger dead zone produces a higher thermal efficiency and less system wear and noise but the occupants will notice temperature changes in excess of about 3°, imposing a practical limit on the maximum width of the dead zone.

In practice, the dead zone is typically set to something slightly less than 3° because after the thermostat contact is open, turning off the burner, the furnace continues to raise the temperature of the house for a short period of time while the blower forces previously heated air into the room. This produces a "thermal overshoot" in which the temperature of the house reaches a maximum some period of time after the furnace burner is de-energized and the maximum temperature excursion into the thermostat room is somewhat higher than the temperature differential represented by the dead zone in the thermostat. The extent to which this thermal overshoot occurs varies as a function of thermal loss of the heated building to the exterior: in the winter it may be very slight and in the spring when a relatively small temperature differential exists between the heated building and the exterior, it will be substantially larger because the heated air left in the furnace and ducts when the burner is extinguished will produce a larger temperature rise in the house. The thermal overshoot will also vary as the function of the building construction. A building with masonry walls must be heated for a longer period of time than a wood frame building to produce a specific temperature change. The dead zone setting is necessarily a compromise which produces an overly large temperature excursion in warm weather and an unnecessarily short excursion in cold weather.

A similar compromise must be made in setting the lower temperature limit of the dead zone. The room temperature continues to drop for some period of time after the conventional thermostat recognizes the low temperature setting of the dead zone and de-energizes the furnace burner. This lag results from the time required for the furnace bonnet to heat up to a sufficient temperature to allow the blower to be started. In cold, windy weather this "undershoot" will be larger than in warm still weather when there is a low rate of heat loss from the house.

Similar compromises must also be made with respect to the time delay between energization of the furnace burner and the time the blower is started. This delay is desirable to prevent cold air being blown into the heated room, however, the optimum time for the delay varies as a function of the ambient temperature on the furnace and heating ducts and will typically be longer in cold weather than in warm weather. Similarly, the furnace blower is typically operated for a predetermined period of time after the furnace burner is de-energized to move all of the heated air into the room. The time of this delay should ideally vary as a function of the ambient temperature on the building in order to insure that all of the heat is removed from the furnace before the blower is shut off but no cold air is blown into the heated parts of the building.

All of these compromises affect the thermal efficiency of the heating system. If the burner's cycle time for a specific building could be optimally adjusted for each set of atmospheric conditions the thermal efficiency of the furnace system would be improved.

DISCLOSURE OF THE INVENTION

The present invention eliminates the need to set the temperature dead zone and blower time delay associated with thermostats at compromise levels by providing a thermostat including adaptive means which senses the change in building temperature which occurs as a result of various manipulations of the time of energization and/or de-energization of the furnace and of the blower time delays and adaptively modifies either or both of the on and off cycles of the furnace and the delays associated with the blower to optimize the energy efficiency of the furnace at the immediate ambient conditions.

One embodiment of the invention, which will subsequently be described in detail, adaptively controls the length of time that the furnace is energized after the ambient temperature on the thermostat drops to the bottom of the set-point dead zone. The system includes a counter, set to a predetermined number, and a clock. When the thermostat controls the furnace to energize the burner, the clock outputs are counted until the predetermined number is attained and then the burner is de-energized. The measured ambient temperature during the heating cycle and the following cycle in which the burner is off is monitored and if a temperature equal to the upper setting of the dead zone is attained the number in the preset counter is decremented by one unit. If the upper value in the dead zone is not attained during that time the value in the counter is incremented by one unit. The number stored in the counter and thus the length of the heating cycle which occurs each time that the room temperature drops to the lower value of the setpoint dead zone will thus be adaptively modified to follow the rate at which the furnace heats the building, which is inversely proportional to the rate of heat exchange between the building and its exterior. In cold weather the stored number and the heating cycle time will be adaptively decreased so that the system overshoots to approximately the maximum value of the set-point dead zone, independently of environmental conditions.

In an alternative embodiment of the invention the length of time in which the furnace is de-energized is similarly controlled by an adaptive counter to compensate for "thermal undershoot"; i.e., the drop in temperature in the building which occurs after the furnace is energized. This dual control provides a highly precise dead zone independently of ambient temperature.

In still another embodiment of the invention similar adaptive counters are provided to control the delay in energization of the furnace blower after the burner is energized and the period in which the blower continues to operate after the burner is de-energized. In this embodiment the determination as to whether the counters should be incremented or decremented is based on an analysis of temperature changes at the thermostat.

The register that times the delay that occurs between the time the burner is energized and the time that the blower is energized is controlled by a comparison of the temperatures at the thermostat just before the blower is energized and a short period of time afterward. If energization of the blower results in a lowering of the room temperature the register is incremented to increase the delay time. If a temperature increase occurs as soon as the blower is turned on, the delay is too long and the register is decremented. Similarly, the register that controls the delay between the time the burner is turned off and the later time at which the blower is turned off is based upon an analysis of temperatures during the delay period. If the temperature continues to increase during the full delay period the delay register is incremented to increase the blower on time. This produces a delay adaptive to the maximum overshoot period and thus optimizes the thermal efficiency associated with the delay.

It should be understood that the control system of the present invention could operate on a valve in a hot water system or a damper in a zone control system as well as on the furnace directly and when the term "furnace" or "heat modifying apparatus" are used hereinafter they should be understood to encompass such flow control devices as well as prime heating or cooling devices themselves.

While the control functions performed by the present invention are highly sophisticated, they require little or no hardware beyond that associated with a conventional electronic thermostat of the type described in my U.S. Pat. Nos. 4,172,555 or 4,206,872. When the system employs a micro-processor the necessary modification to achieve these control functions, and their attendant improvement in thermal efficiency, may be implemented completely in software.

Other objectives, advantages and applications of the present invention will be made apparent by the following detailed description of the preferred embodiment of the invention. The description makes reference to the accompanying drawings in which:

DESCRIPTION OF THE PREFERRED EMBODIMENT

Figure 1:
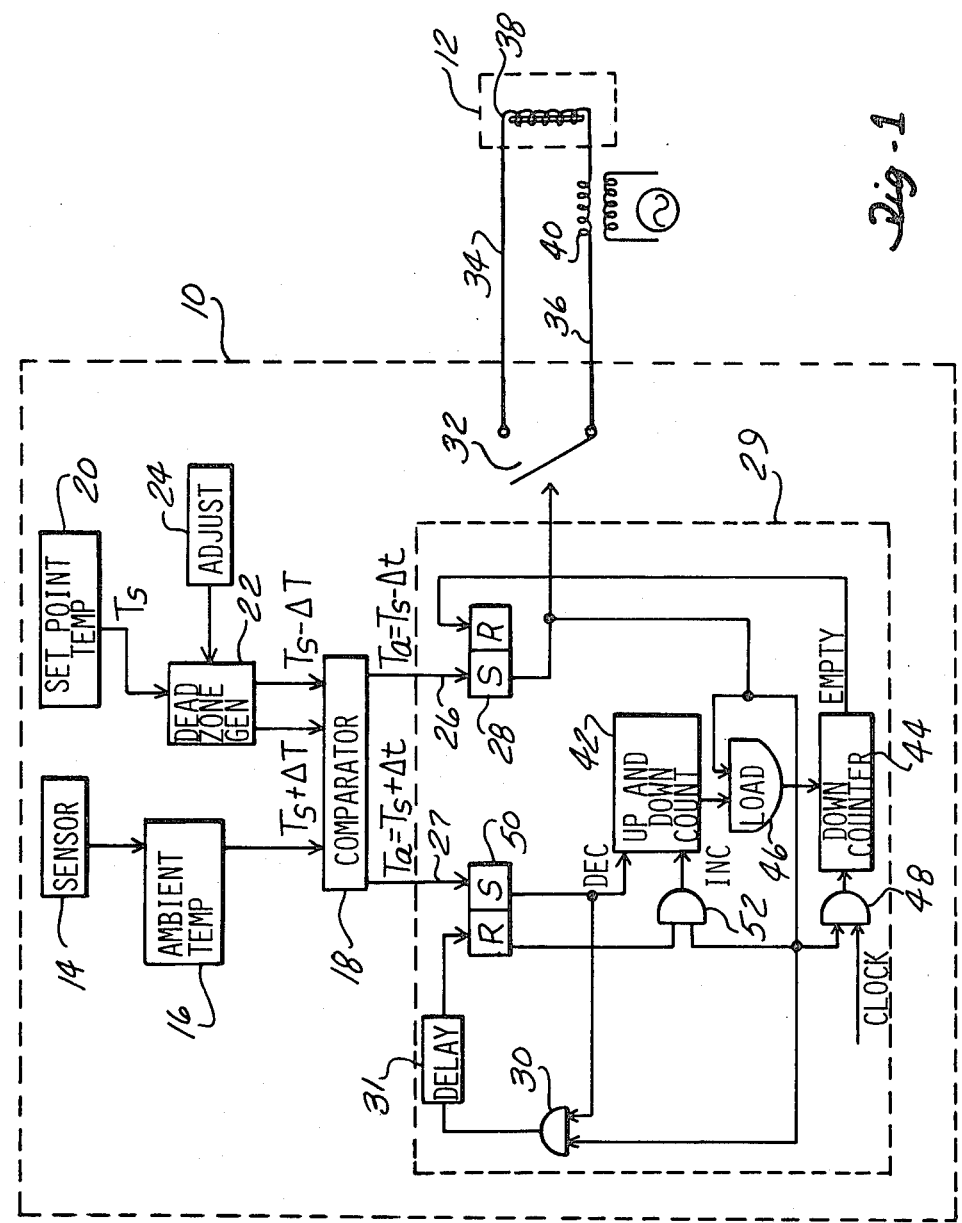
FIG. 1 is a schematic drawing of a first embodiment of my invention which adaptively modifies the furnace burn time to prevent overshoot.

FIG. 1 is a schematic diagram of a first embodiment of my invention, comprising an electronic thermostat, generally indicated at 10, connected to a furnace 12 so that the furnace burner is energized for a predetermined period of time each time the temperature ambient to the thermostat falls below the predetermined set point value and operative to adaptively modify the burning time to provide a predetermined increase in the ambient temperature during the burn time, such as 2 or 3° F.

Thermostat 10 is preferably of the general type disclosed in my U.S. Pat. No. 4,172,555 in that it is microprocessor based. The thermostat 10 is adapted to be disposed within a structure heated (or cooled) by the furnace 12. The thermostat includes a sensor 14 operative to generate an analog electrical signal representative of the instantaneous temperature in the vicinity of the thermostat. The output of the sensor 14 is provided to an ambient temperature generating circuit 16 to establish a digital signal $T_a$, proportional to the ambient temperature. This signal is provided to a digital comparator 18.

The thermostat also includes means 20 for generating a desired set-point temperature $T_s$. This set-point may be manually adjusted as in a conventional mechanical residential thermostat or may be derived from a stored program of desired temperatures over a repetitive time cycle as disclosed in my U.S. Pat. No. 4,172,555. The set-point temperature is provided to a dead zone generator 22 which adds and subtracts the same value from the set-point temperature to derive two signals $T_s + \Delta T$ and $T_s - \Delta T$ which are provided to the comparator 18. The value of the dead zone may be controlled by an adjustment 24 which may be manual or could be program controlled. The dead zone will usually be set at about 3° F.; however, when a building is unoccupied so that the physical discomfort associated with a larger temperature variation is not a factor, a substantially larger dead zone, with its attendant increase in thermal efficiency, may be desirable.

Assuming that the temperature set-point is 70° F. and the dead zone is set to 2° F., the two signals provided to the comparator 18 by the dead zone generator 22 may represent 69° F. and 71° F. The system operates so as to initiate the furnace burner when the ambient temperature falls to 69° F. The burner is energized for a predetermined time which is adaptively adjusted to bring the room temperature to 71° F.

The comparator provides an output signal on line 26 to the set input of a flip-flop 28 when the ambient temperature is less than or equal to the lower limit of the dead zone. The flip-flop 28 forms part of an adaptive circuit 29, delineated by a line. The comparator 18 also provides an output signal on line 27 to the set input of a flip-flop 50 when the ambient temperature is greater than or equal to the high side of the dead zone. The signal on line 26 sets the flip-flop 28 and provides an output to a relay 32 which closes a set of thermostatic contacts within the thermostat. These two contacts are connected by wires 34 and 36 to a solenoid valve 38 disposed within the furnace 12 and connected in series with the secondary of a step-down transformer 40 which provides power to the solenoid. In alternative embodiments of the invention the set output of flip-flop 28 might control a solenoid valve in a fluid heating system, a zone control damper, heat pump or similar device.

The setting of a flip-flop 28 also loads a digital number contained within an up down counter 42 into a down counter 44, via a load AND gate 46. The set output of flip-flop 28 is also provided to an AND gate 48 which receives regular clock pulses from the system clock as its other input. These pulses may occur at any desired intervals such as 30 seconds, one minute, etc. Accordingly, while the flip-flop 28 is set these clock pulses are applied to the down counter 44 and decrement the counter. When the counter has reached zero an output is provided to the reset input of flip-flop 28 removing the signal from the thermostat relay 32 and de-energizing the burner solenoid. In this manner the furnace burner is energized for a time period dependent upon the number contained in the counter 42 at the beginning of a burner cycle.

At any time that an output is provided by the comparator on line 27, indicating that the ambient temperature has reached the upper limit of the dead zone, the flip-flop 50 will be set and will provide an output to the counter 42 causing the count in the counter to be decremented by one unit. The counter 42 may be similarly incremented by a signal from an AND gate 52 which is conditioned by the reset output of flip-flop 50 and the set output of flip-flop 28. Accordingly, if flip-flop 50 is still in its reset condition when the next burner cycle is initiated by the setting of flip-flop 28, the count will be incremented by one unit. One unit may represent a time unit of 30 seconds, one minute or the like. Flip-flop 50 is reset by an output signal from an AND gate 30 which is conditioned by the set output of flip-flop 28 and the set output of flip-flop 50. The output of the AND gate 30 is delayed by one clock time by unit 31. This delay prevents the counter 42 from being unintentionally incremented based solely on the fact that the flip-flop 28 is in its set condition. In this manner the status of counter 42 is modified once each burn cycle and the modification is in such a direction as to cause it to hunt about a burn cycle length that will cause the ambient temperature to reach the upper limit of the dead zone, $T_s + \Delta T$, at the end of the burn cycle.

Figure 2:
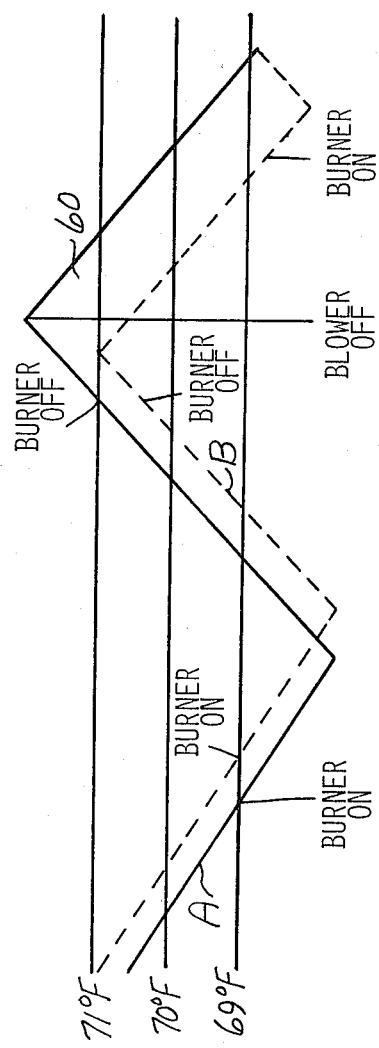
FIG. 2 is a graphic representation of temperature variation within a building employing a conventional thermostat and the system of FIG. 1.

The heating curve that results in the thermostat room as the result of the use of the system of FIG. 1 is illustrated in FIG. 2. The solid line A of FIG. 2 represents the operation of a furnace controlled by a conventional thermostat in which the burner is turned on when the room temperature drops to the bottom of the dead zone and is turned off when the room temperature reaches the top value of the dead zone. The blower is turned on and off a predetermined period of time after the burner goes on and off. It is clear that a thermal overshoot, generally indicated at 60, occurs with this type of operation because of the residual heat of the furnace. The degree of overshoot will depend upon the heat loss of the building to the exterior but the overshoot volume represents both a psychological annoyment to the room occupant because of a noticeable temperature change as well as unnecessary heating that reduces the efficiency of the system. The dotted line B illustrates the heating curve using the system of FIG. 1 in which the burner on time is adaptively modified to achieve a peak room temperature coincident with the top of the dead zone. The burner goes off before the maximum temperature is attained. The overshoot produced by the residual heat of the furnace brings the temperature up the dead zone limit.

In the system of FIG. 1, a thermal undershoot occurs by virtue of the building continuing to cool after the burner is turned on at the bottom of the dead zone. The psychological discomfort produced by this extension of thermal dead zone and the thermal inefficicney caused by the need to reheat the room through this undershoot are corrected by the system of FIG. 3 which provides a timed "burner off" period which is adaptively modified to prevent undershoot.

Figure 3:
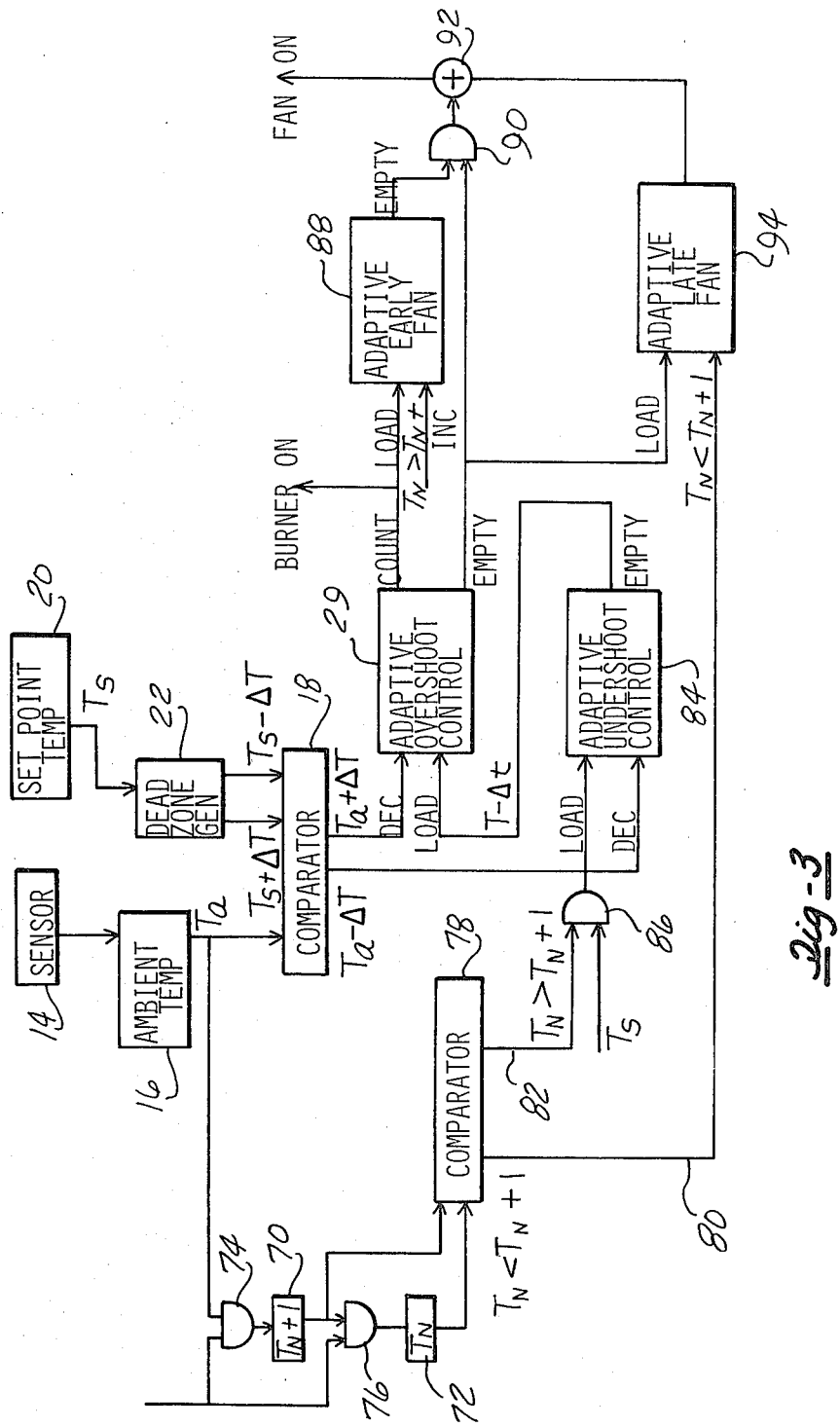
FIG. 3 is schematic diagram of a second embodiment of my invention which adaptively modifies the time period between burner cycles, the blower delay after the burner is initiated, and the period for which the blower continues in operation after the burn cycle ends, as well as adaptively modifying the burner cycle time.

The system of FIG. 3 also adaptively controls the time delay which occurs between ignition of the burner and powering of the blower at the start of a burn cycle as well as the off delay of a blower following extinguishment of the burner at the end of a burn cycle.

The system of FIG. 3 employs many of the components of the system of FIG. 1 and the same numerals employed in the system of FIG. 1 have been applied to these common components.

The system of FIG. 3 includes a pair of temperature registers 70 and 72. The register 70 is loaded with the ambient temperature signal outputted by unit 16 once each clock cycle, through and AND gate 74. On the next clock cycle the contents of the register 70 are loaded into the second register 72 through an AND gate 76. The contents of register 72 at any instance are denominated at $T_{n+1}$. The outputs of both of these registers are continually provided to a comparator 78 which generates an an output signal on line 80 when $T_n < T_{n+1}$ and an output on line 82 when $T_n > T_{n+1}$.

The adaptive overshoot control 29 employed in the system of FIG. 3 is identical to the subsystem 29 of the circuit of FIG. 1 except that its signal receives its load signal when an adaptive undershoot control 84 empties. The adaptive undershoot control 84 is identical to the adaptive overshoot control 29 in structure. It receives its load signal from an AND gate 86 when the set point temperature $T_s$ equals the ambient temperature and the ambient temperature is decreasing as signified by an output on line 82 indicating that $T_n > T_{n+1}$. The undershoot control contains a predetermined counter which is incremented once each load cycle unless the ambient temperature reaches $T_s - \Delta T$, during that count time. In the event that temperature is obtained the number in the undershoot control empties it provides a signal to the overshoot control 29 which causes it to begin its count. The number in the overshoot control 29 is incremented by one unit once each load cycle unless the ambient temperature reaches $T_s + \Delta T$, during the load cycle, in which case the counter in the overshoot control 29 is decremented.

The output signal from the overshoot control 29 indicating that the control is counting is provided to the furnace burner and also to an adaptive early fan control 88, acting as a load signal and causing control 88 to begin counting. The stored count in control 88 is decremented by one unit, once each load cycle, unless the temperature within the room begins to decrease, as indicated by an output from the comparator 18 denominated $T_n>T_{n+1}$, in which case the count in the early fan control is incremented by one unit. When the early fan control has exhausted its count it provides a signal to an AND gate 90. The AND gate is also conditioned by the empty signal from the adaptive overshoot control 29. The output of the AND gate 90 is provided to an OR gate 92 which provides a signal to the furnace fan. This control may be summed with thermostatic signal generated by the thermostatic control in the fan bonnet (not shown), which initiates the fan operation when the bonnet temperature exceeds a preset value.

The adaptive late fan signal thus acts as an adaptive time delay which prevents initiation of the fan operation for a period of time after the burner is initiated which is adaptively adjusted so that the fan begins operation as soon as it will warm the room. If its operation begins too early, so that its operation would cool the room, the time delay is adaptively decreased.

An empty signal from the adaptive overshoot control 29 acts as a load signal for an adaptive late fan control 94, of the same design as the adaptive circuits 29, 84 and 88. The count in the adaptive late fan control 94 is incremented once each load cycle unless the temperature within the room begins to increase during its count time, as signified by a signal on line 80 from the comparator 78, which causes the count within the adaptive late fan control 94 to be decremented by one unit. The count output from the late fan control 94 is provided to the OR gate 92 and causes the fan to be energized for a period after the burner shuts off, which period is adaptively adjusted to insure that the temperature within the room does not begin to decrease by operation of the fan.

The system of FIG. 3 thus adaptively modifies both the furnace burn time, and the period between consecutive burn times, to maintain the temperature in the conditioned room within the limits of the dead zone.

I claim:

1. In a thermostat operative to be connected to a temperature modifying apparatus to control the operative state of the apparatus and including means for generating an electrical signal representative of a desired temperature set-point and means for generating an electrical signal representative of the ambient temperature at the thermostat, the improvement comprising: means for generating control signals for the temperature modifying apparatus operative to control it into a state which causes the ambient temperature to move toward the set point and means for adaptively modifying the time of termination of each said control signals as a function of the change in ambient temperature produced the previous time the temperature modifying apparatus was controlled to said state.

2. The thermostat of claim 1 in which the temperature modifying apparatus includes a device operative to be disposed in either an energized or de-energized state and said control signals have one of two possible values, one of the values corresponding to the energized state and the other corresponding to the de-energized state of the device.

3. The thermostat of claim 2 in which the temperature modifying apparatus is a furnace having a burner and the control signals energize or de-energize the furnace burner.

4. The temperature modifying apparatus of claim 3 in which the control signal from the thermostat maintains the burner in an energized state and the time of termination of the control signal is adaptively modified to attain a predetermined maximum temperature which is a function of said set-point, based upon the increase in the ambient temperature at the thermostat following termination of said signal the previous time it was generated.

5. The thermostat of claim 2 in which the temperature modifying apparatus comprises a valve disposed between a source of heated fluid and a sink.

6. The thermostat of claim 2 in which the temperature modifying apparatus is a furnace having a blower and the control signals energize or de-energize the furnace blower.

7. The thermostat of claim 5 in which said energizes said furnace blower and the time of termination of said signal is adaptively modified to achieve the maximum heat transfer from the furnace to the building during each cycle of operation of the blower.

8. In an electronic thermostat adapted to be disposed within a building structure having a temperature modifying apparatus connected to the thermostat so as to be controlled between energized and de-energized states, including means for generating a temperature set-point and means for measuring the ambient temperature at the thermostat, the improvement comprising: timer means for generating a control signal operative to maintain the temperature modifying apparatus in its energized state, means for adaptively modifying the period of said control signal as a function of the temperature changes produced at the thermostat the previous times the temperature modifying apparatus was in its energized state and the duration of the previous control signal in order to provide a temperature at the thermostat which is a function of the first set-point temperature following each cycle of energization of the temperature modifying apparatus by the thermostat.

9. The thermostat of claim 1 including means for generating an electrical signal representative of a second desired temperature set-point, and means for initiating generation of one of said control signals based upon comparison of said electrical signal representative of the ambient temperature and the electrical signal representative of the second desired temperature set-point.

10. The method of controlling the temperature within an enclosed volume employing apparatus including means for measuring the temperature within the enclosed volume, means for establishing a pair of separated temperature values defining a dead zone, and a temperature modifying apparatus having an energized and a de-energized state and operative when energized to modify the temperature of the enclosed volume in a first direction, comprising: switching the temperature modifying apparatus between its energized and de-energized states and maintaining the temperature modifying apparatus in its energized state each time it is energized, for a period of time which is either shorter or alternatively longer than the time period that it was maintained in its energized state the previous time it was energized, depending upon whether the temperature in the enclosed volume did or alternatively did not exceed the limit of the dead zone in said first direction the previous time the temperature modifying apparatus was energized.

11. The method of claim 10 in which each period of de-energization of the furnace between periods of energization is increased or decreased in length relative to the previous period of de-energization as a function of whether or not the temperature within the enclosed volume reached the limit of the dead zone in a direction opposite to the change of state of temperature produced by the temperature modifying apparatus following the initiation of the previous period of de-energization of the temperature modifying apparatus.

12. The method of claim 11 in which the temperature modifying apparatus includes a blower which is energized following a delay period after energization of the temperature modifying apparatus, and each such delay period is varied in length with respect to the previous such delay period depending upon the direction of change of temperature in the enclosed volume following the previous energization of the blower.

* * * * *

UNITED STATES PATENT AND TRADEMARK OFFICE
CERTIFICATE OF CORRECTION

PATENT NO. : 4,356,962
DATED : November 2, 1982
INVENTOR(S) : Michael R. Levine

It is certified that error appears in the above-identified patent and that said Letters Patent are hereby corrected as shown below:

Column 5, line 5 insert --dotted-- before "line"

Column 5, line 20 delete "a" before "flip-flop"

Column 6, line 40 "and" should be --an--

Column 6, line 46 delete "an"

Column 6, line 62 after "control" insert --is decremented by one. When the overshoot control--

Column 7, line 16 insert --signal-- after "control"

Column 7, line 58 insert --of-- after "each"

Column 8, line 20 delete "5" and insert --6--

Column 8, line 20 after "said" insert --signal--

Signed and Sealed this

Fifteenth Day of March 1983

[SEAL]

Attest:

GERALD J. MOSSINGHOFF

Attesting Officer

Commissioner of Patents and Trademarks